(12) United States Patent
Hilder et al.

(10) Patent No.: US 6,451,102 B1
(45) Date of Patent: Sep. 17, 2002

(54) PIGMENT MODIFICATION IMPROVING HANDLING CHARACTERISTICS

(75) Inventors: Robin Hilder, Sheffield (GB); Manfred Kieser, Darnstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/563,926

(22) Filed: May 4, 2000

(51) Int. Cl.[7] ............ C04B 14/20; C09C 1/04; C09C 1/36; C08L 91/06; C09D 101/06
(52) U.S. Cl. .......... 106/417; 106/415; 106/428; 106/429; 106/430; 106/436; 106/439; 106/270; 106/272; 106/502; 106/660
(58) Field of Search ............... 106/415, 417, 106/428–430, 436, 439, 660, 270, 272, 502

(56) References Cited

U.S. PATENT DOCUMENTS

| | | | | |
|---|---|---|---|---|
| 3,953,218 A | * | 4/1976 | Pollard | 106/19 |
| 4,173,492 A | * | 11/1979 | Pollard | 106/308 |
| 4,325,862 A | * | 4/1982 | Schuster | 524/87 |
| 4,457,784 A | | 7/1984 | Bernhard et al. | 106/291 |
| 4,482,389 A | | 11/1984 | Franz et al. | 106/291 |
| 4,509,988 A | | 4/1985 | Bernhard | 103/308 R |
| 4,537,636 A | | 8/1985 | Bernhard et al. | 106/291 |
| 4,759,801 A | * | 7/1988 | Goldmann et al. | 106/502 |
| 4,879,199 A | * | 11/1989 | Gruber et al. | 430/137 |
| 5,604,279 A | | 2/1997 | Bernhard et al. | 524/427 |
| 6,129,784 A | * | 10/2000 | Ikuta et al. | 106/417 |
| 6,262,143 B1 | * | 6/2001 | Leidner et al. | 523/164 |

* cited by examiner

*Primary Examiner*—Mark L. Bell
*Assistant Examiner*—Patricia L. Hailey
(74) *Attorney, Agent, or Firm*—Millen, White, Zelano & Branigan, P.C.

(57) ABSTRACT

The present invention is directed to a process for producing a master batch of pigment, comprising mixing a pigment having a high aspect ratio, embedded in a material increasing bulk density of the pigment, with a plastic so as to produce a dispersion of pigment and plastic.

15 Claims, 2 Drawing Sheets

PIGMENT MODIFICATION IMPROVING HANDLING CHARACTERISTICS

The poor solid flow characteristics of high aspect ratio materials (i.e., having a long length compared to width, e.g., platelet-shaped) such as mica are well known. In many industries, such as paint and ink manufacture, this does not cause any significant problems. However, in the case of extruder based plastics processing it leads comparatively low output rates for any given size of machine. This is perhaps somewhat surprising since high aspect ratio pigments such as pearlescent pigments have a relatively high density and therefore might be expected to give good results as is the case for fillers of similar density such as calcium carbonate.

Natural mother of pearl achieves its luster effect by alternating structure layers of calcium carbonate and protein. Apart from the practical difficulties of obtaining industrial quantities of this material it does not have sufficient mechanical, chemical and heat stability to be used in thermoplastic systems. Modern synthetic pearl luster pigments are based on metal oxide coated mica, which can be adapted to give a wide range of optical effects. The precise effect for any given grade is critically dependent on both the alignment of the individual platelets within the polymer matrix as well as the precise nature and thickness of the coating. This makes pearl luster pigments particularly susceptible to mechanical damage.

Pearl luster pigments are well known to cause hopper bridging in some extreme cases spanning openings of 300 mm or more. In an extruder feed port and zone, solid material must flow through relatively small channels and openings which is difficult when processing pearl luster pigments. This means that plastics processors face a particular challenge in comparison to ink and paint manufacturers where solid/liquid mixing takes place generally in large tanks.

Extruder design and configuration naturally play an important part in determining the maximum throughput when using normal powder pigment; but there are limits to what can be achieved by this route. The use of deep flighted screw elements in the primary feed zone in combination with one or more side feeders can go a long way to compensating for these problems; but this does represent a capital intensive solution. Within a masterbatching company, it is also rarely the case that an extruder can be specifically assigned and configured for high aspect ratio pigments such as pearlescent pigment production and therefore it is desirable to make the these pigments behave more like conventional pigments.

Many masterbatch manufacturers also suffer from a lack of peak plant capacity, when average plant utilization is high and their customers' order pattern follows seasonal or monthly cycles. At such times, the opportunity costs of tying down an extruder running at a fraction of its theoretical capacity can be enormous.

High aspect ratio pigment-containing polyolefin masterbatches (MB) and compounds are typically produced from the pure pigment and polyolefin powder and/or granules. Due to the nature of the MB-process with pure high aspect ratio such as pearl-luster pigments very narrow limits are imposed on processing, and negative side effects are experienced. Such limits are:

a) Much less throughput with double screw extruders and very low loading of MB with single screw extruders, with less throughput.

b) Additionally high dust and a complex recipe are involved. Due to the dust production with such pigments cleaning of the machinery is very time extensive.

There are some materials on the market (where, e.g., pearl luster pigment is pre-wetted with high boiling organic liquids) and methods (employing certain additives) which decrease these disadvantages slightly, but the need to improve the results currently obtainable is still very high.

SUMMARY OF THE INVENTION

It has thus been found that the above disadvantages are greatly reduced when high aspect ratio pigments such as pearl luster pigments are embedded in a material which improves their flow characteristics. By embedded is meant that the pigment particles are surrounded by or coated at least partly with a material affecting the surface properties in a way which improves its flow characteristics. Preferably, the pigments have at least a 50% higher bulk density than the pure pigment powder. Bulk density is the apparent density of molding materials. The bulk density of loose pigments is expressed as a ratio of weight to volume. The ratio pigment to coating material can be, e.g., 80:20 to 60:40, preferably 70:30.

Virtually any material which improves flow properties of the pigment may be used. Preferred are waxes or thermoplastics compatible with the masterbatch into which the pigment will be incorporated. For incorporation in polyolefin masterbatches, polyolefin waxes are preferred, e.g., polyethylene or polypropylene waxes. Preferred waxes have a melting point of 70–200° C., more preferably 80–150° C. Also preferred are montan ester waxes and amide waxes. Particularly preferred is polyethylene wax.

Nearly any pigment subject to flow problems in masterbatch production can be used in the invention. Preferably, high aspect ratio pigments such as flake-shaped or platelet-shaped pigments are used, more preferably, pearlescent or "nacreous" pigments. Pearlescent pigments are typically at lest one metal oxide coated on a platelet-shaped substrate; e.g., natural or synthetic mica, kaolin, talc, $SiO_2$ flakes, $TiO_2$ flakes or glass flakes. Metal oxides include $TiO_2$ and $Fe_2O_3$. Such pigments are sold commercially by Merck KGaA, Darmstadt, under the Iriodin®, and are disclosed in, e.g., U.S. Pat. Nos. 4,457,784; 4,509,988; 4,537,636; and 4,482,389. Embedded pearlescent pigments are also available commercially, e.g., from Merck KGaA and EM Industries under the tradename Iriodin®WM 8. Typical pigment particle sizes are, e.g., 10–60 μm. Moreover, embedded pigments can be prepared by mixing uncoated pigment with the coating material in the absence of a solvent.

Production of master batches is conventional, e.g., as disclosed in U.S. Pat. No. 5,604,279. Typically, master batches are produced by combining pigment and plastic binder, e.g., in a mixer or extruder, e.g., a single or twin screw extruder. Plastic binders include virtually any thermoplastic desired to be pigmented with the master batch, e.g., polyolefins, especially polyethylene wax (high and low density: PE-HD, PE-LD) and polypropylene wax (high and low density: PP-HD, PP-LD).

At any point in the process, conventional additives can be added. Such additives include soluble and/or insoluble colorants, antistatics, lubricants and/or flame retardants. Surface active agents can be avoided, if desired, to avoid unpredictable side effects.

The use of embedded pigments does not result in a degradation of the pigment plate structure. A microscopic analysis of samples prepared from identical batches showed no variations even for very large particles which are known to be particularly sensitive. A similar freedom from damage can be seen with interference grades, where conventional processing almost inevitably leads to a loss of interference effects and vibrancy. Embedment can therefore make a significant contribution to achieving particularly intense coloration, e.g., intense pearlescent effects.

The large increased in throughput at any given screw speed are not accompanied by an identical rise in drive torque. This means that specific energy input is reduced in comparison to power pigment formulations. The processor may also take further advantage of the improvements in throughput by reducing screw speeds and hence shear, whilst retaining economic production rates. Since screw configurations can rarely be altered due to the pressures of production, in many cases this offers the only practical option for reducing platelet damage.

Except for compounds and masterbatches containing very low loadings of pigment twin screw extruders are for most companies the only practical processing option. At higher loadings, single screw extruders can only be used in combination with z-blade or internal mixers and/or conventional masterbatch. This is in many respects unfortunate since single screw extruders offer excellent low shear processing at low capital cost.

The present pigment concentrates can, however, be used without any problems at all on single screw machines at pigment loadings of up to 40% with strand lines and 50% with die face cutters. This represents a considerable breakthrough and will almost certainly lad to more creative use of strong effects, e.g., pearlescent effects.

Where, as is often the case, pearlescent pigments are used in combination with organic pigments single screw extruders cannot effectively disperse the additional colorants. However, use of a twin screw machine to provide the necessary shear can result in significant plate damage. In many cases, it may be preferable to add the organic toner as either a mono- pigment concentrate or a conventional masterbatch. Since the organic element is usually only a small part of the total pigmentation, the additional costs are not great and may well be more than covered by a reduction in the quantity of pearlescent pigment required.

Embedment, e.g., wax encapsulation, like oil damping, also may make a significant contribution to workplace hygiene. Dust levels during weighing, blending and processing are greatly reduced in comparison to un-encapsulated pigment. This is particularly advantageous in production situations where mechanical ventilation is limited. Moreover, certain polyethylene wax binders are FDA approved, as are pearlescent pigments themselves, and are suitable for direct food contact applications.

This process also has a valuable role in eliminating production difficulties with hopper bridging and automatic weighing and dosing systems.

Given the density and flow characteristics of the resulting 30% pearlescent pigment masterbatch, it is clear that the limiting factor could not be the melt pump capacity of the extruder. This means that it is the solid rather than the liquid flow which determines maximum output.

In these extruder trials, a maximum output was determined as the point at which the extruder started to flood feed with a 30% loaded powder pre-blend.

Figure 1:
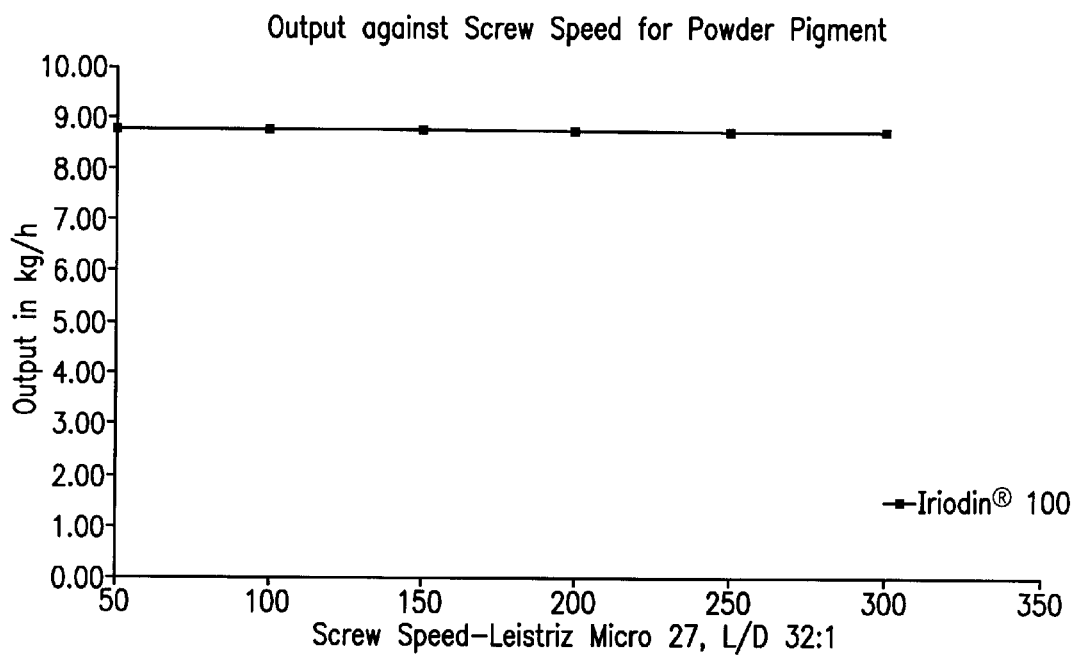
FIG. 1 shows the output against extruder screw speed. Within normal operating limits, the maximum output is independent of screw speed.
Figure 2:
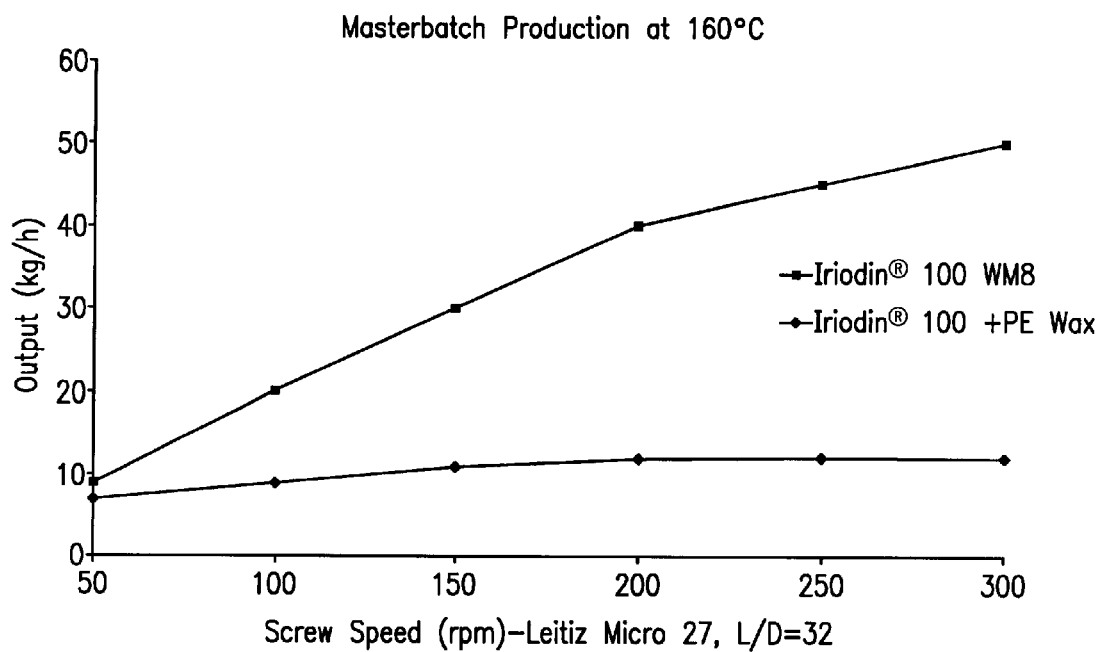

FIG. 2 shows a comparison between formulation containing identical quantities of polymer, wax and pigment. One is a simple add-mix, and the other, the pigment in the wax binder. It is possible that even greater gains could have been achieved had the extruder been run on open discharge since die flooding occurred at 50 kg/h. In comparison to oil damped pigment, a doubling of output occurs at roughly half the screw speed.

Only minor variations in extruder output was observed for any given screw speed, across a wide temperature range. This emphasizes that it is the solid flow rather than the melt flow characteristics that are the determining factor in maximum output.

Using a simple technique very familiar in the ink industry, although more commonly applied to liquid systems, the cup discharge performance of various blends of powder polymer, standard pearl luster pigment and its encapsulated form were examined. The cup used was a 45° cone with a 12.5 mm orifice, and in each case the discharge time for a 50 g sample was determined to give a discharge rate in grams per second.

Figure 3:
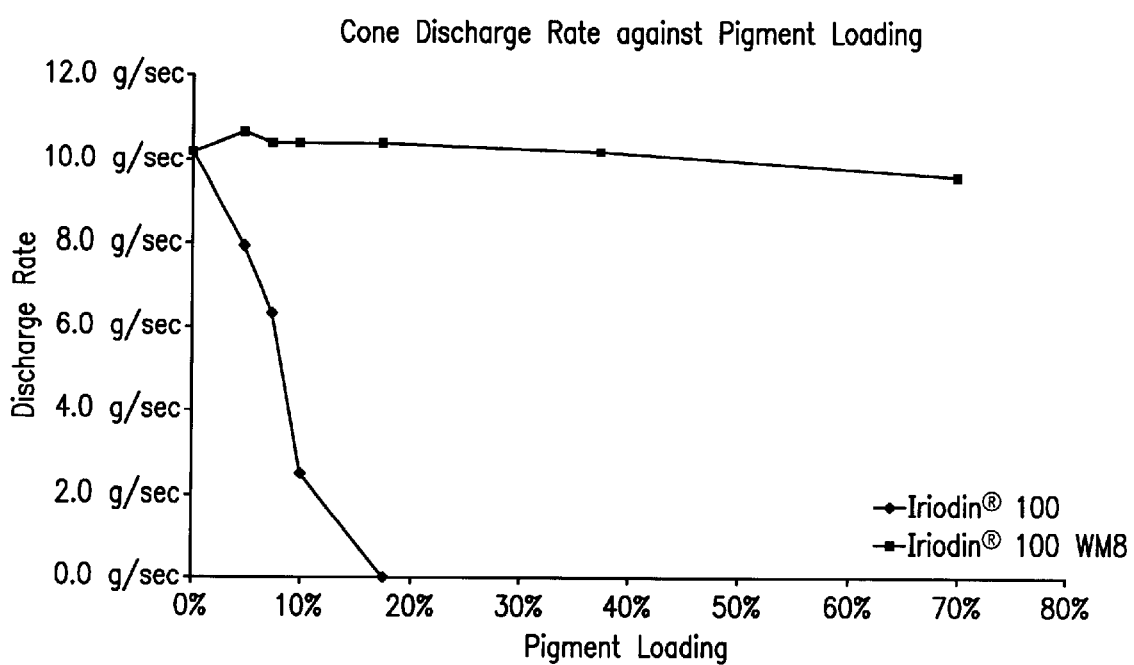

From FIG. 3, it is clear that the powder pigment blends suffer a catastrophic flow failure at loadings of about 10%. Indeed at 10%, light tapping of the cup was necessary to maintain flow. The embedded pigment, in comparison, is entirely free flowing, even at 100%, which is equivalent to a pigment loading of 70%, since it contains 30% wax binder. This discharge rate is also more or less independent of loading, since its bulk density is comparable to that of the polymer. While this is a very simple test in comparison to an extruder feed zone, it does provide a dramatic example of how the embedment boosts solid powder flow.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below is hereby incorporated by reference.

EXAMPLES

Example 1

(Single-screw Extruder)

On a single-screw extruder with a screw diameter of 45 mm and an L/D ratio of 25, a mixture of 20 parts of a $TiO_2$-mica-pearlpigment (Iriodin® 100 Silverpearl) and 80 parts PE LLD (Escorene® 6101 RQ, Exxon) powder was extruded. The extrusion did not run constant, the extrusion line "pumps". As a result, the masterbatch production with 20% pearl content is not possible on such a device.

Masterbatch production on this line is possible up to a concentration of about 10% pearl pigment.

Example 2

(Single-screw Extruder)

On a single-screw extruder with a screw diameter of 45 mm and an L/D ratio of 25 a mixture of 40 parts of a $TiO_2$-mica-pearlpigment low molecular PE preparation (Iriodin® 100 Silverpearl WM8) and 60 parts PE LLD (Escorene® 6101 RQ, Exxon) powder was extruded. The extrusion ran without any problems. The quality of the masterbatch was O.K.

Example 3
(Twin-screw Extruder, Screws Rotating in the Same Sense)

On a twin-screw extruder (screws rotating in the same sense) with a screw diameter of 27 mm and an L/D ratio of 36, a mixture of 30 parts of a $TiO_2$-mica pearlpigment (Iriodin® 100 Silverpearl) and 70 parts PE LLD (Escorene® 6101 RQ, Exxon) powder was extruded. The throughput could be improved at 160° C. melt temperature up to 14 kg/h.

The quality of the masterbatch was O.K.

Example 4
(Twin-screw Extruder, Screws Rotating in the Same Sense)

On a twin-screw extruder (screws rotating in the same sense) with a screw diameter of 27 mm and an L/D. ratio of 36, a mixture of 42.9 parts of a $TiO_2$-mica pearlpigment) Iriodin® 100 Silverpearl) and 70 parts PE LLD (Escorene® 6101 RQ, Exxon) powder was extruded. The throughput could be improved at 160° C. melt temperature up to 14 kg/h. A higher throughput would be possible, but the dosing feeder had a limitation at 50 kg/h.

The quality of the masterbatch was O.K.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for producing a master batch of pigment, comprising mixing a pigment having a high aspect ratio platelet-shaped substrate coated with at least one metal oxide and embedded in a material increasing bulk density of the pigment, with a plastic so as to produce a dispersion of pigment and plastic.

2. A process for producing a master batch of pigment, comprising mixing a pearlescent pigment having a high aspect ratio platelet-shaped substrate coated with at least one metal oxide and embedded in a wax with a plastic so as to produce a dispersion of pigment and plastic.

3. The process of claim 2, comprising blending, extruding, pelletizing or granulating a pearlescent pigment having a high aspect ratio platelet-shaped substrate coated with at least one metal oxide and embedded in wax with a plastic so as to produce as final product a dispersion of pearlescent pigment and plastic as pellets or granules.

4. The process of claim 1, wherein the pigment embedded in wax and polymer are mixed and melted in a single screw extruder or twin screw extruder.

5. The process of claim 1, wherein the pigment is embedded in wax.

6. The process of claim 2, wherein the pigment embedded in wax is encapsulated by polyethylene wax.

7. The process of claim 2, wherein the pigment embedded in wax is encapsulated by montan wax.

8. The process of claim 2, wherein the pigment embedded in wax is encapsulated by amide wax.

9. The process of claim 1, wherein the pigment is mica coated with at least one metal oxide.

10. The process of claim 1, wherein the platelet-shaped substrate is natural or synthetic mica, kaolin, talc, $SiO_2$ flakes, $TiO_2$ flakes or glass flakes.

11. The process of claim 1, wherein the metal oxide is titanium dioxide and/or $Fe_2O_3$.

12. The process according to claim 1, wherein the plastic is a thermoplastic.

13. The process according to claim 12, wherein the thermoplastic is a polyolefin.

14. The process according to claim 13, wherein the polyolefin is polyethylene or polypropylene.

15. The process according to claim 1, further comprising mixing at least one soluble and/or insoluble colorant, antistatics, lubricants and/or flame retardants.

* * * * *